United States Patent
Moreton et al.

(10) Patent No.: US 7,171,051 B1
(45) Date of Patent: Jan. 30, 2007

(54) METHOD AND APPARATUS FOR PERFORMING FIXED BLOCKSIZE COMPRESSION FOR TEXTURE MAPPING

(75) Inventors: Henry P. Moreton, Woodside, CA (US); Justin S. Legakis, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 780 days.

(21) Appl. No.: 10/464,618

(22) Filed: Jun. 17, 2003

(51) Int. Cl.
*G06K 9/36* (2006.01)
*G06K 9/00* (2006.01)
*G06K 9/46* (2006.01)

(52) U.S. Cl. ...................... 382/233; 382/165

(58) Field of Classification Search ............... 382/162, 382/164, 165–167, 190, 232, 233, 243; 358/515, 358/518; 345/418, 582, 589, 591, 593, 600–604
See application file for complete search history.

(56) References Cited

U.S. PATENT DOCUMENTS

| 6,339,428 B1 * | 1/2002 | Fowler et al. ............... 345/582 |
| 6,424,342 B1 * | 7/2002 | Perlman et al. ............. 345/418 |
| 6,819,793 B1 * | 11/2004 | Reshetov et al. ........... 382/166 |
| 6,956,965 B1 * | 10/2005 | Cuijpers .................... 382/164 |
| 6,959,110 B1 * | 10/2005 | Danskin et al. ............. 382/166 |

\* cited by examiner

*Primary Examiner*—Amir Alavi
(74) *Attorney, Agent, or Firm*—Patterson & Sheridan, L.L.P.

(57) ABSTRACT

Method and apparatus for providing texture and/or alpha compression. In one embodiment, the present invention incorporates stored palettes, e.g., a luminance palette and a chrominance palette such that, compressed texture data pertaining to a fixed blocksize is decoded and applied to the stored palettes to extract the texel data. In a second embodiment, the present method uses a plane to estimate the alpha value at each of the texels, and a three-bit correction factor to adjust the estimate to produce a final alpha value.

38 Claims, 17 Drawing Sheets

FIG. 13

METHOD AND APPARATUS FOR PERFORMING FIXED BLOCKSIZE COMPRESSION FOR TEXTURE MAPPING

The present invention relates to a novel method and apparatus for performing compression and decompression. More specifically, the present invention provides texture compression and decompression in texture mapping.

BACKGROUND OF THE DISCLOSURE

Texture mapping is a known technique in computer graphics for creating surface details on objects that greatly improves on the realism of their appearance. Generally, the technique involves mapping a two dimensional function or image (a texture) onto an object in three-dimensional object space and then projecting the resultant image back into two-dimensional screen space for display. The image that is mapped onto an object is called a texture map and its individual elements are often called texels. A texel's numerical value generally corresponds to an RGB color value and may also correspond to an alpha transparency value. However, it should be noted that other parameters can be included in the texture maps.

One of the factors determining performance of texture mapping is available texel bandwidth. Reducing the amount of data describing each texel is one approach to improve performance, beyond increasing clock speed and improving cache behavior. Reducing the amount of data associated with each texel can be accomplished by simply reducing the precision of color values. However, loss of color precision impacts the quality of the displayed images.

Another method to reduce the amount of data required to describe a texel is through the use of compression. However, many factors must be considered in selecting a compression/decompression scheme, e.g., lossy compression versus lossless compression, fixed compression ratio versus variable compression ratio, and so on. Generally, the application of compression to textures is applicable to those schemes that support direct/efficient addressing of arbitrary texels.

Therefore, a need exists for a novel method and apparatus that is capable of performing texture compression and decompression in texture mapping that will not reduce image quality while providing relatively high compression ratio.

SUMMARY OF THE INVENTION

In one embodiment of the present invention, a novel method and apparatus for providing texture and/or alpha compression is disclosed. Specifically, the present invention incorporates compression/decompression of texture and/or alpha data to reduce computational demands, e.g., reducing texel bandwidth.

In one embodiment, a decoder is employed in a texture unit to operate with a plurality of stored palettes, e.g., a luminance palette and a chrominance palette. In operation, compressed texture data pertaining to a fixed blocksize is decoded and applied to the stored palettes to extract the texel data.

In a second embodiment, a 2 to 1 compression is achieved where 8 bytes are used to represent 16 alpha values in a 4×4 block of texels. The present method uses a plane to estimate the alpha value at each of the texels, and a three-bit correction factor to adjust the estimate to produce a final alpha value. In other words, the present invention stores only two (2) out of the sixteen (16) alpha values explicitly for each 4×4 block, and then defines a gradient that interpolates those two points. Each of the other 14 alpha values is then defined using a correction factor that represents a deviation from that gradient.

BRIEF DESCRIPTION OF THE DRAWINGS

The teachings of the present invention can be readily understood by considering the following detailed description in conjunction with the accompanying drawings, in which:

FIG. 13 illustrates a plurality of different gradient directions and the corresponding fractional values;

To facilitate understanding, identical reference numerals have been used, where possible, to designate identical elements that are common to the figures.

DETAILED DESCRIPTION

Figure 1:
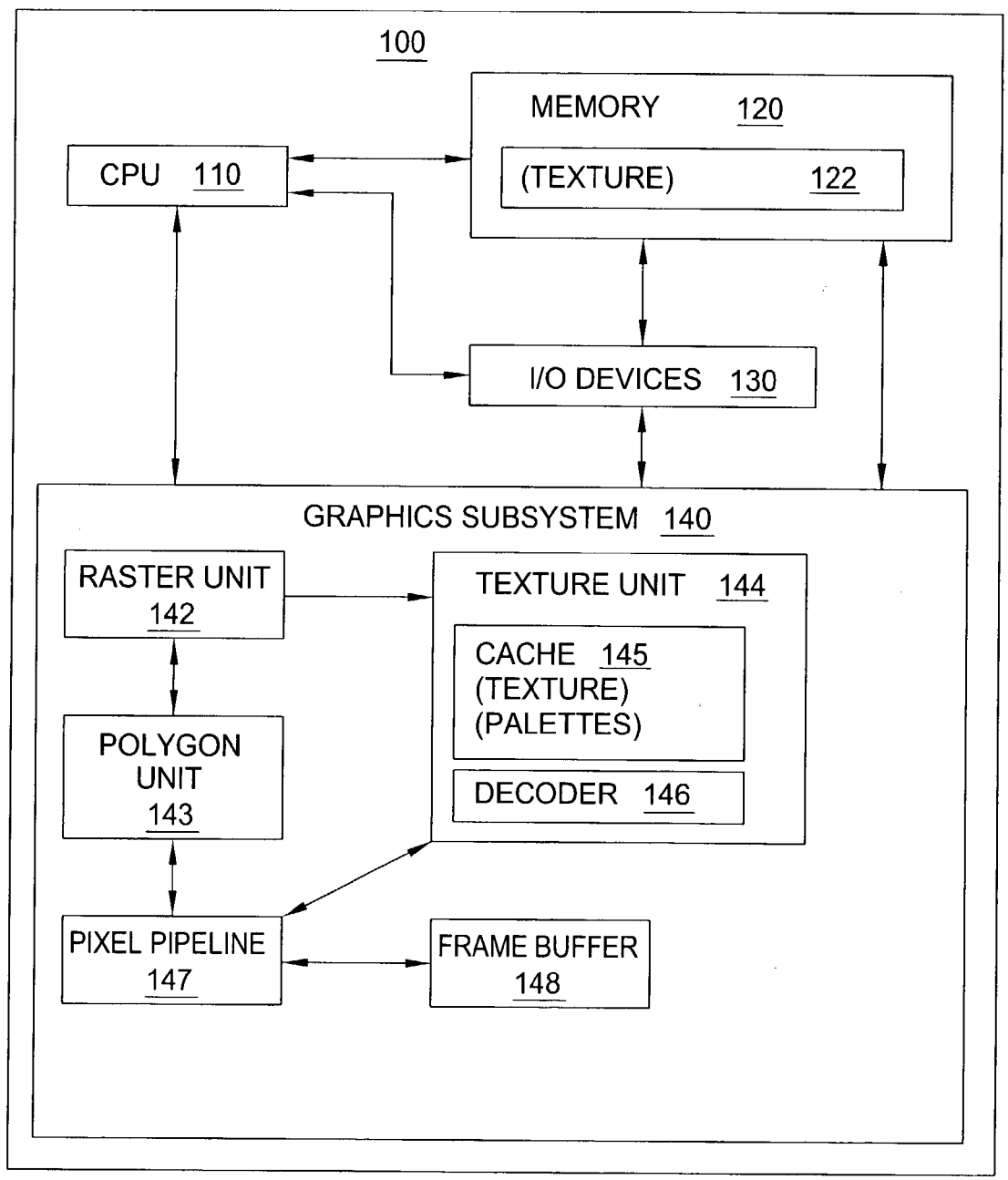
FIG. 1 illustrates a block diagram of a general purpose computer system implementing the present invention.

FIG. 1 illustrates a block diagram of a general purpose computer system 100 implementing the present invention. The computer system 100 comprises a central processing unit (CPU) 110, a system memory 120, a plurality of Input/Output (I/O) devices 130, and a graphics subsystem or a graphics accelerator 140.

In one embodiment, the graphics subsystem 140 or parts thereof can be physical devices that are coupled to the CPU 110 through a communication channel. Alternatively, the various modules or components within the graphics subsystem 140 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 120 of the computer. As such, the graphics subsystem 140 or parts thereof (including associated data structures as discussed below) of the present invention can be stored on a computer readable medium, e.g., RAM memory, magnetic or optical drive or diskette and the like.

The I/O devices include, but are not limited to, a keyboard, a mouse, a display, a storage device (e.g., disk drive, optical drive and so on), a scanner, a printer, a network interface, a modem, a transmitter, a receiver and the like. It should be noted that various controllers, bus bridges, and interfaces (e.g., memory and I/O controller, I/O bus, AGP bus bridge, PCI bus bridge and so on) are not specifically shown in FIG. 1. Instead, FIG. 1 simply illustrates line connections between various subsystems. However, those skilled in the art will realize that various interfaces are deployed within the computer system 100, e.g., an AGP bus bridge can be deployed to interface graphics subsystem 140 to a system bus. It should be noted that the present invention is not limited to a particular bus or system architecture.

Graphics subsystem 140 generally comprises a raster unit 142, a polygon unit 143, a texture unit 144, a pixel pipeline 147 and a frame buffer 148. It should be noted that graphics subsystem 140 is broadly represented in FIG. 1 by these modules, but it may embody additional modules or less modules in accordance with a particular implementation. For example, the frame buffer 148 can be implemented outside of the graphics subsystem 140.

In brief, the raster unit 142 receives data, e.g., from CPU 110 in the form of three-dimensional coordinates (x,y,z) for each vertex of the triangles comprising a modeled object. In turn, the raster unit computes texture coordinates (u,v) for each pixel, i.e., defining the position for a pixel on a texture map. Any pixel may cover a number of particular texels on a texture map. The texture coordinates determined by the raster define a position on the texture map at which the center of a pixel appears on the screen.

The texture coordinates are forwarded to the texture unit 144 and are used to derive texture values from the texels. In turn, the polygon unit 143 performs well known polygon rendering functions with respect to the position, color and perspective of the ploygon primitive. Finally, the pixel pipeline unit 147 blends the texture data from the texture unit and the pixel data from the polygon unit to form a composite polygon image. The composite polygon image is then forwarded and stored in frame buffer 148, where it can be retrieved for further processing or to be displayed on one of the I/O devices 130, e.g., a display.

More specifically, the texture unit 144 receives polygon vertex data that corresponds to respective polygons to be rendered. The polygon vertex data may include data points for each vertex of the polygon. With respect to triangle polygons, each of the three vertexes contains: its own position coordinate values (x,y,z), its own color values (red, green, blue), its own texture map coordinate values (u,v), its own perspective value (w), and other required values. The texture unit 144 is tasked with retrieving the relevant texture map data for the polygon and mapping the texels of the texture data onto the pixels of the polygon. Once the texture unit is provided with the texture map coordinates (u,v) for each vertex of a triangle, it can access the matching texels for placement into the triangle.

The desired textures can reside in several locations. First, the texels 122 can reside in the main system memory 120, where the memory has a relatively large capability, but access to the texels may experience significant delays, because various bus and controllers are shared by all components in the computer system. Alternatively, the texels may reside in the frame buffer 148, where the frame buffer has a moderate storage capacity, but access to the texels may experience moderate delays due in part to the bandwidth limitations associated with accessing frame buffer memory via a frame buffer controller. Finally, the texels may reside within a texture cache 145 within the texture unit 144, where it is immediately available, but its size is typically very limited. Thus, for texture mapping, it is preferable to use the frame buffer 148 as a cache to main memory 120 and, in turn, to use the texture cache 145 as a cache to the frame buffer.

However, given the architecture as illustrated above or any other graphics subsystem architectures for that matter, reducing memory storage and/or bandwidth requirements will greatly increase the speed and efficiency of texture mapping. Namely, the process of texture mapping requires a great demand on the memory capacity of the graphics subsystem where many texture maps are accessed during a typical display screen update. Since the frequency of the screen update cycles is rapid, the individual polygons of the screen and their related texture map data are accessed and updated at an extremely rapid pace that requires great data throughput capabilities.

Thus, the present invention incorporates compression/decompression of texture data to reduce computational demands, e.g., reducing texel bandwidth. In one embodiment, a decoder 146 is employed in the texture unit 144 to operate with a plurality of stored palettes, e.g., a luminance palette and a chrominance palette. In operation, compressed texture data pertaining to a fixed blocksize is decoded and applied to the stored palettes to extract the texel data. A detailed description of the present compression/decompression method is described below.

The present invention presents two approaches for texture compression, one scheme for RGB texels, and one scheme for RGBα texels. In one embodiment of the present invention, both approaches employ color values that are represented in perceptual space, e.g., using a variant of the CbYCr color space.

Figure 2:
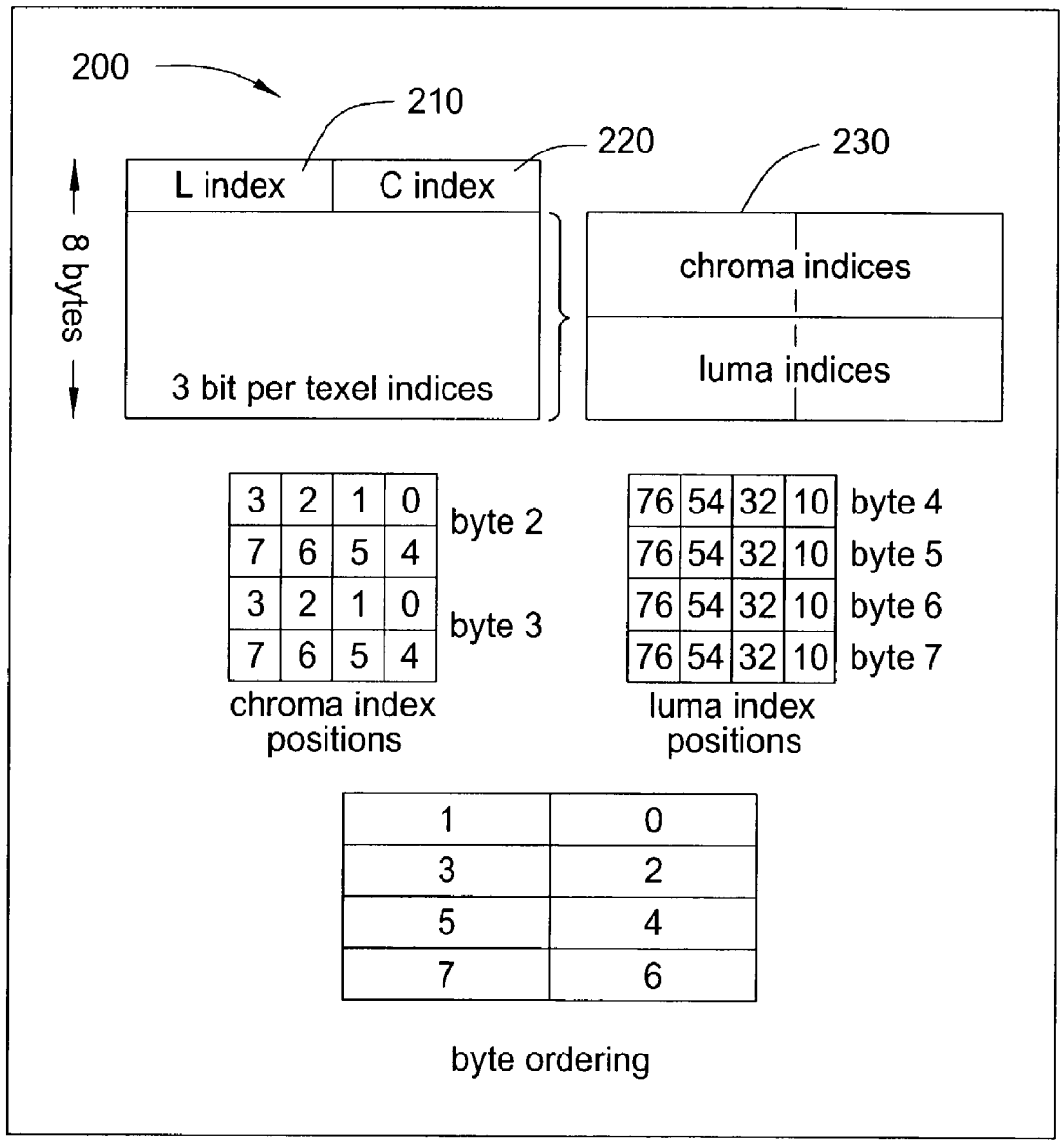
FIG. 2 illustrates a compressed texture data structure of the present invention.

FIG. 2 illustrates a compressed texture data structure 200 of the present invention. The present invention is designed to describe a fixed-size block of texels using a compressed code word, thereby minimizing the amount data that must be transmitted, e.g., to a texture unit, to extract the proper texel values. A unique aspect of the present invention is the use of stored palettes.

In one embodiment, the RGB compression method employs eight (8) bytes to represent a four by four (4×4) block of texels. Although the present invention discloses a code word having a particular length for a particular block size, those skilled in the art will realize that code words having other lengths and/or other block sizes can be adapted to the present invention.

Specifically, the scheme uses two palettes, a palette of chrominance values and a palette of luminance values. Each eight-byte code word contains a pair of indices into these palettes, one index (L index) 210 for the luminance palette (one byte) and one index (C index) 220 for the chrominance palette (one byte). In addition to the two palette indexes, each block contains three bits per texel 230 in the four by four block of texels. Since there are 3 bits for each of the 16 texels, it requires 48 bits (6 bytes: bytes 2–7) to uniquely identify all the texels in the fixed-size block. The order of these bytes is also illustrated in FIG. 2.

Figure 3:
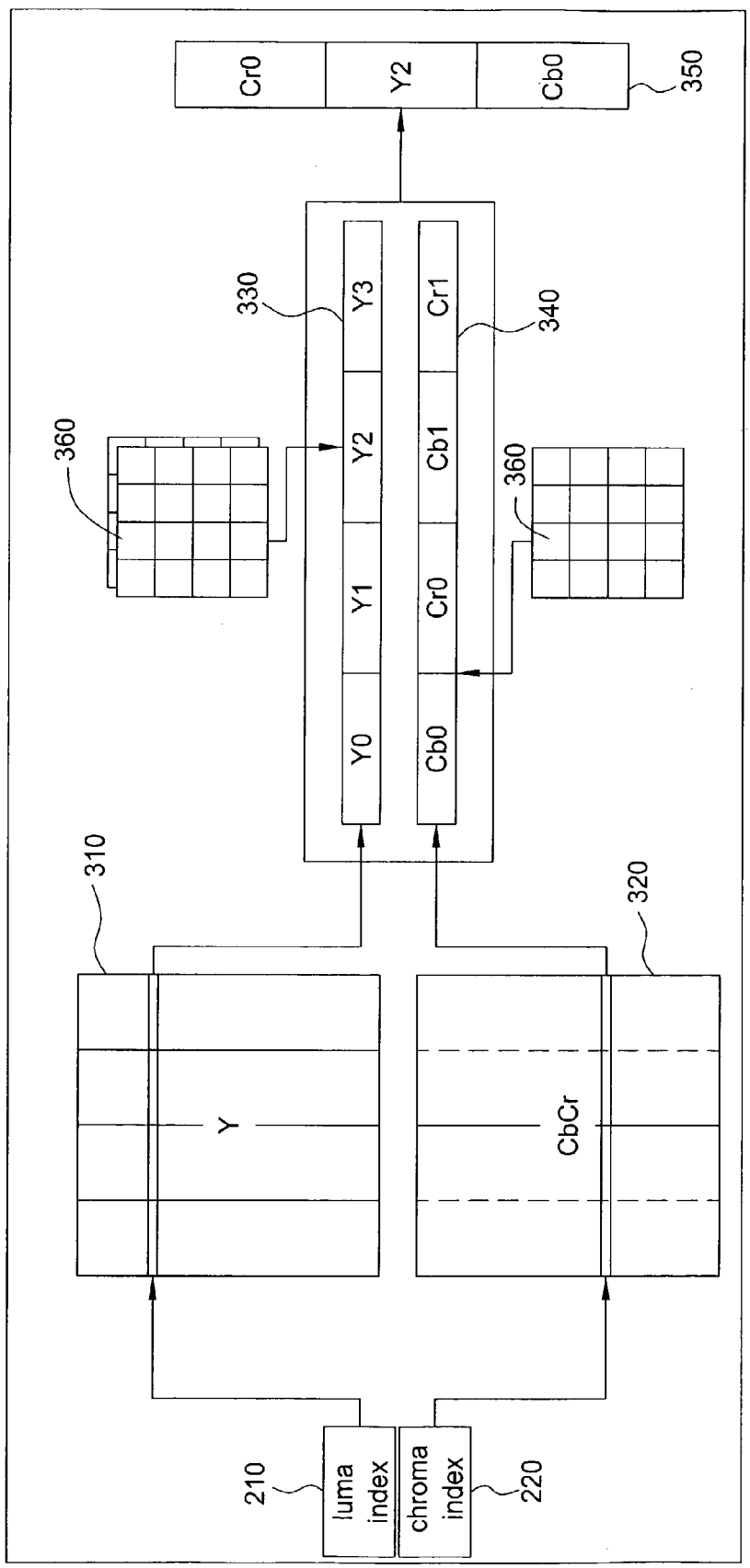
FIG. 3 illustrates the use of the compressed eight-byte code word to extract the relevant texture values of the present invention.

FIG. 3 illustrates the use of the compressed eight-byte code word to extract or decode the relevant texture values from a pair of palettes of the present invention. FIG. 3 illustrates a luminance palette 310 and a chrominance palette 320. In both cases, palette entries within the palettes 310 and 320 are four bytes in size.

In the case of luminance, each palette entry contains four distinct luminance values 330. In the case of chrominance, each palette entry contains two chrominance pairs 340 ($Cb_0$, $Cr_0$ and $Cb_1$, $Cr_1$). Thus, using the luminance index 210 and chrominance index 220, eight bytes of data are extracted from the palettes, i.e., four luminance values and two colors are available for selection. In turn, the remaining 6 bytes of the code word are applied to arrive at the desired texture value 350, e.g., a desired CbYCr for a particular texel 360. Specifically, two bits from the three bits per texel 230 are used to select one of the four luminance values and the remaining single bit is used to select one of the two chrominance pairs.

In one embodiment, the present invention employs color values that are represented in perceptual color space, e.g., using a variant of the CbYCr color space. Thus, once decoded to a CbYCr texel, the texel is converted to RGB using the clamping method disclosed below.

The color space used in the present scheme is a variant of a standard video color space. The coefficients have been adjusted to simplify conversion to RGB during the decoding operation. The conversion to RGB may be described using the following matrix formulation:

$$\begin{Bmatrix} R \\ G \\ B \end{Bmatrix} = \begin{Bmatrix} 0 & 9/8 & 3/2 \\ -3/8 & 9/8 & -3/4 \\ 2 & 9/8 & 0 \end{Bmatrix} \cdot \left( \begin{Bmatrix} C_b \\ Y \\ C_r \end{Bmatrix} - \begin{Bmatrix} 128 \\ 16 \\ 128 \end{Bmatrix} \right)$$

Conversely, the conversion to CbYCr is:

$$\begin{Bmatrix} C_b \\ Y \\ C_r \end{Bmatrix} = \begin{Bmatrix} -4/27 & -8/27 & 4/9 \\ 64/243 & 128/243 & 8/81 \\ 38/81 & -32/81 & -2/27 \end{Bmatrix} \cdot \left( \begin{Bmatrix} R \\ G \\ B \end{Bmatrix} + \begin{Bmatrix} 128 \\ 16 \\ 128 \end{Bmatrix} \right)$$

It is easy to establish that the entire RGB cube is contained within the CbYCr cube. When encoded values are converted from CbYCr to RGB using the matrix formulation, the RGB values may be out of range. Illegal RGB values can be clamped to the legal range using this standard clamp, but the standard clamp may cause changes in the luminance and chrominance. In other words, if the clamping function is not luminance preserving, color shifts can be perceived in the rendered image.

Alternatively, instead of this standard clamp, a luminance preserving clamp can be applied. Since color key relies on specific color values, it is important that the present invention precisely characterizes (bit for bit) the conversion to RGB, including clamping. The following C-code can be implemented to perform the color space conversion:

```
#define DivideBy8(x) (((x)+4)>>3)
void
ToRGB(unsigned char RGB[3], unsigned char CbYCr[3]) {
    int Cb;
    int Cr;
    int Y;
    int lumaWeight_8;
    Cb = CbYCr[0] - 128;
    Y = CbYCr[1] - 16;
    Cr = CbYCr[2] - 128;
    lumaWeight_8 = 9 * Y;
    R = DivideBy8(lumaWeight_8 + 12 * Cr);
    G = DivideBy8(-3 * Cb + lumaWeight_8 - 6 * Cr);
    B = DivideBy8(16 * Cb + lumaWeight_8);
    LumaClamp(RGB, R, G, B);
}
```

The luminance preserving clamp modifies the red, green, and blue components to within the legal range, [0.255]. The amount of luminance gained or lost as a result of clamping is computed and distributed among unclamped components. Note that the middle row of the conversion matrix represents the relative luminances of the three color components: {64/243 128/243 8/81}. The clamping process is greatly simplified by approximating the blue component's luminance with 32/243. Having made this adjustment, the color components have relative luminances of 1, 2, and 4, for blue, red, and green, respectively.

Figure 4:
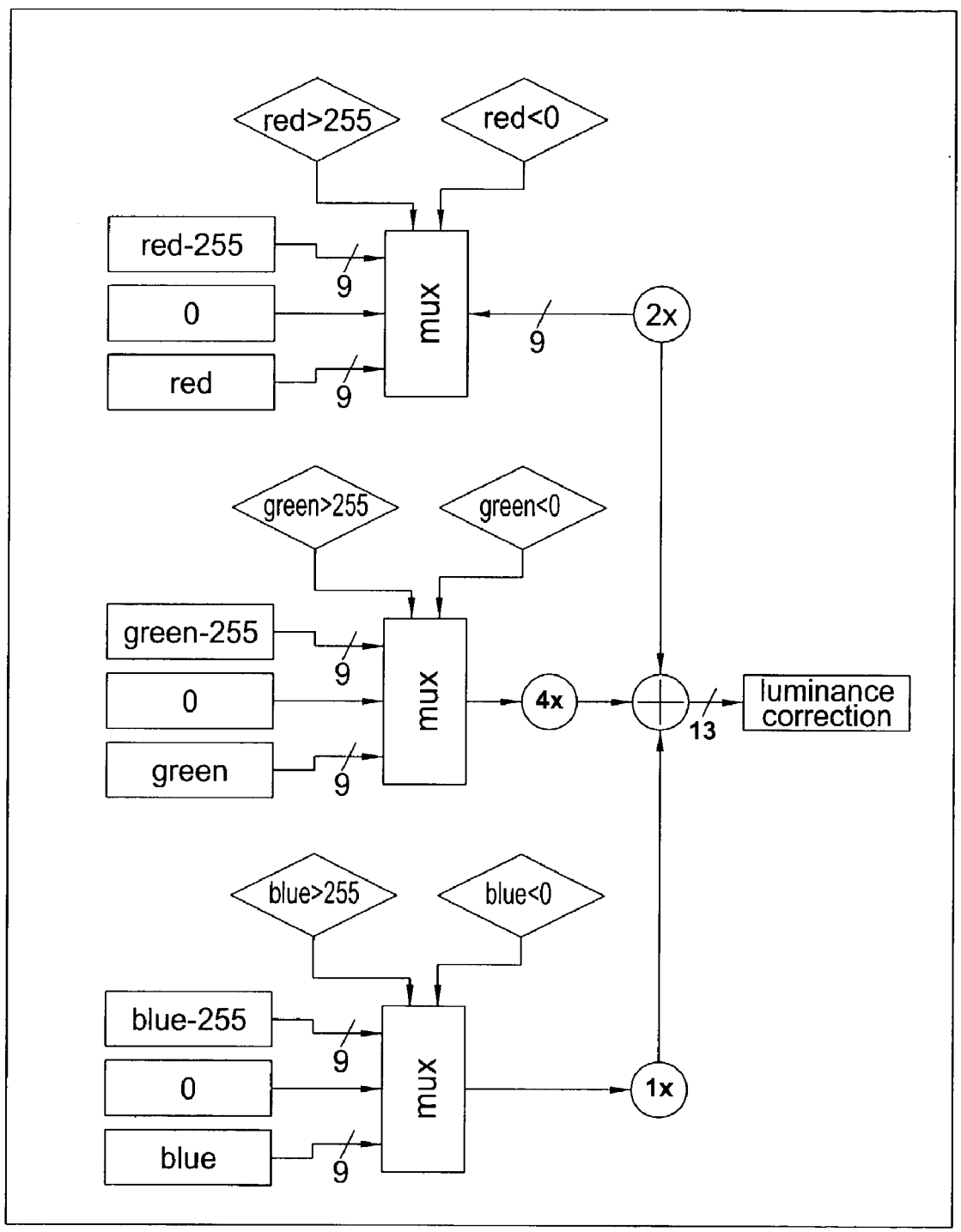
FIG. 4 illustrates a block diagram of an exemplary method for computing the luminance correction factor of the present invention.
Figure 5:
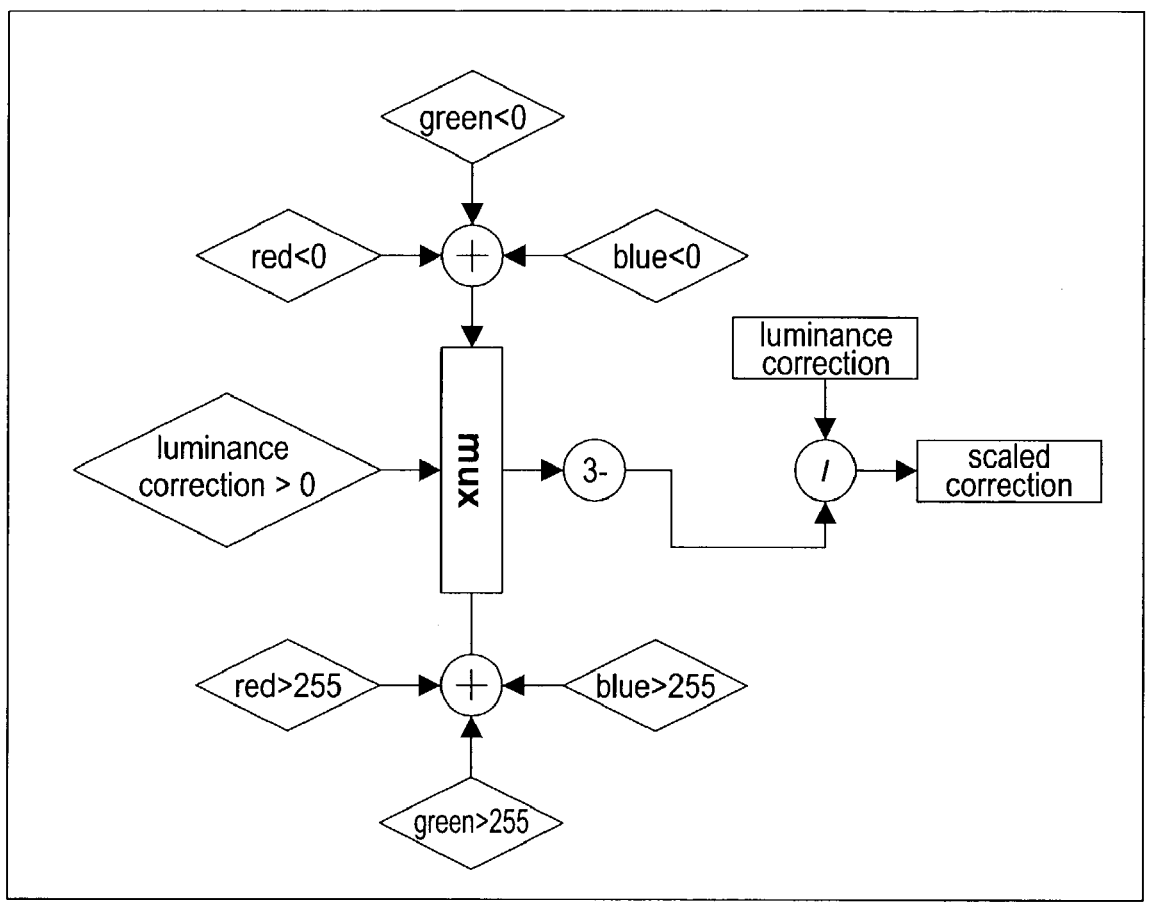
FIG. 5 illustrates a block diagram of an exemplary method for dividing luminance correction.
Figure 6:
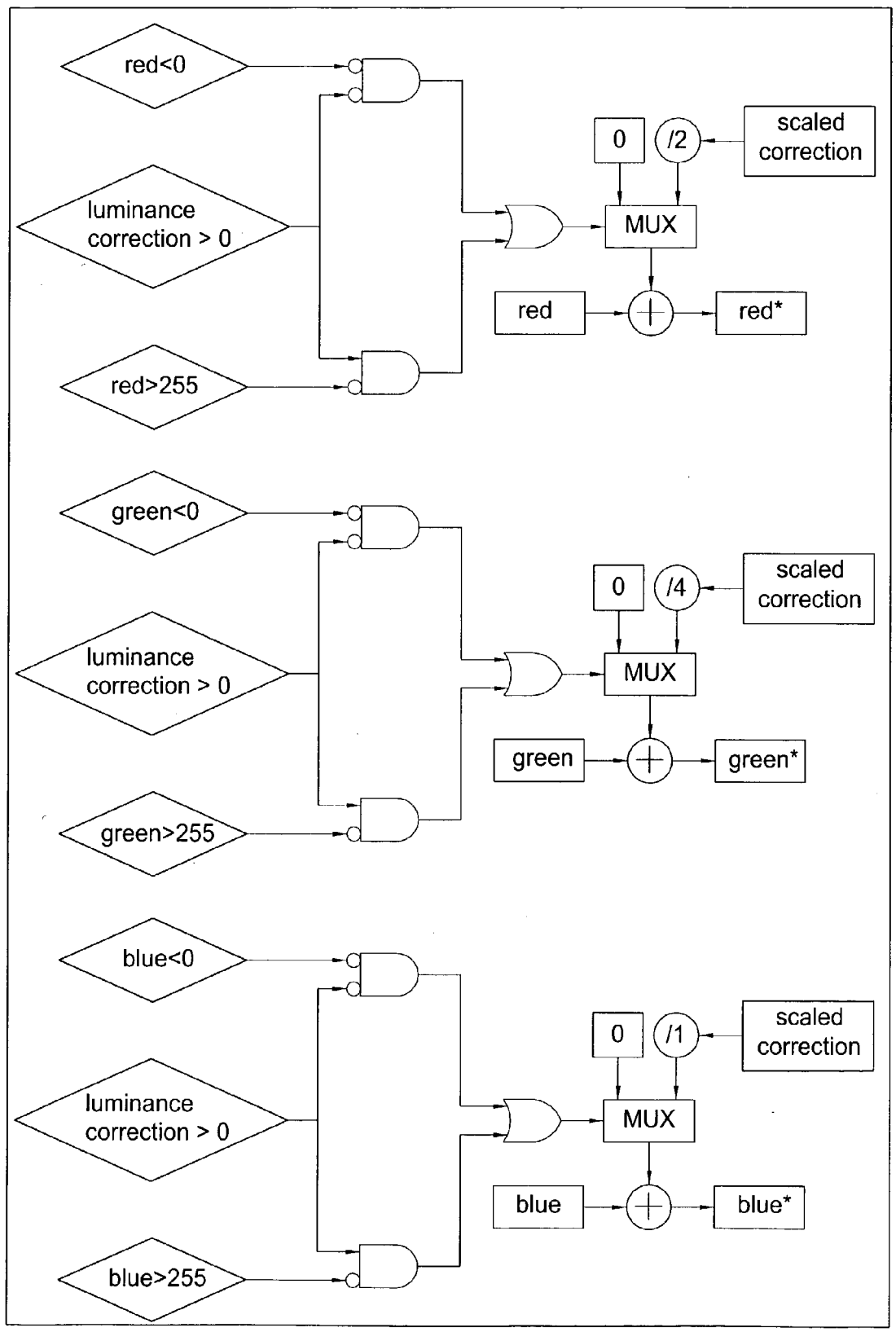
FIG. 6 illustrates a block diagram of an exemplary method for distributing scaled correction among unclamped components.

One exemplary computation of the luminance correction factor is illustrated in FIG. 4. Whereas, in FIGS. 5 and 6, one exemplary distribution of the correction among the unclamped components is illustrated. Although the present invention discloses a particular luminance preserving clamp, other clamping functions can be adapted to the present invention.

In a second embodiment of the present invention, a RGBα compression method employs sixteen (16) bytes to represent a four by four (4×4) block of texels. Eight of the bytes are used to capture the RGB data, exactly as in the RGB decoding scheme as discussed above with the chroma code word zero being reserved to indicate constant alpha. The remaining eight bytes are used to encode alpha.

In one embodiment of the present invention, a 2 to 1 compression is achieved where 8 bytes are used to represent 16 alpha values in a 4×4 block of texels. The present method uses a plane to estimate the alpha value at each of the texels, and a three-bit correction factor to adjust the estimate to produce a final alpha value. In other words, the present invention stores only two (2) out of the sixteen (16) alpha values explicitly for each 4×4 block, and then defines a gradient that interpolates those two points. Each of the other 14 alpha values is then defined using a correction factor that represents a deviation from that gradient.

Figure 7:
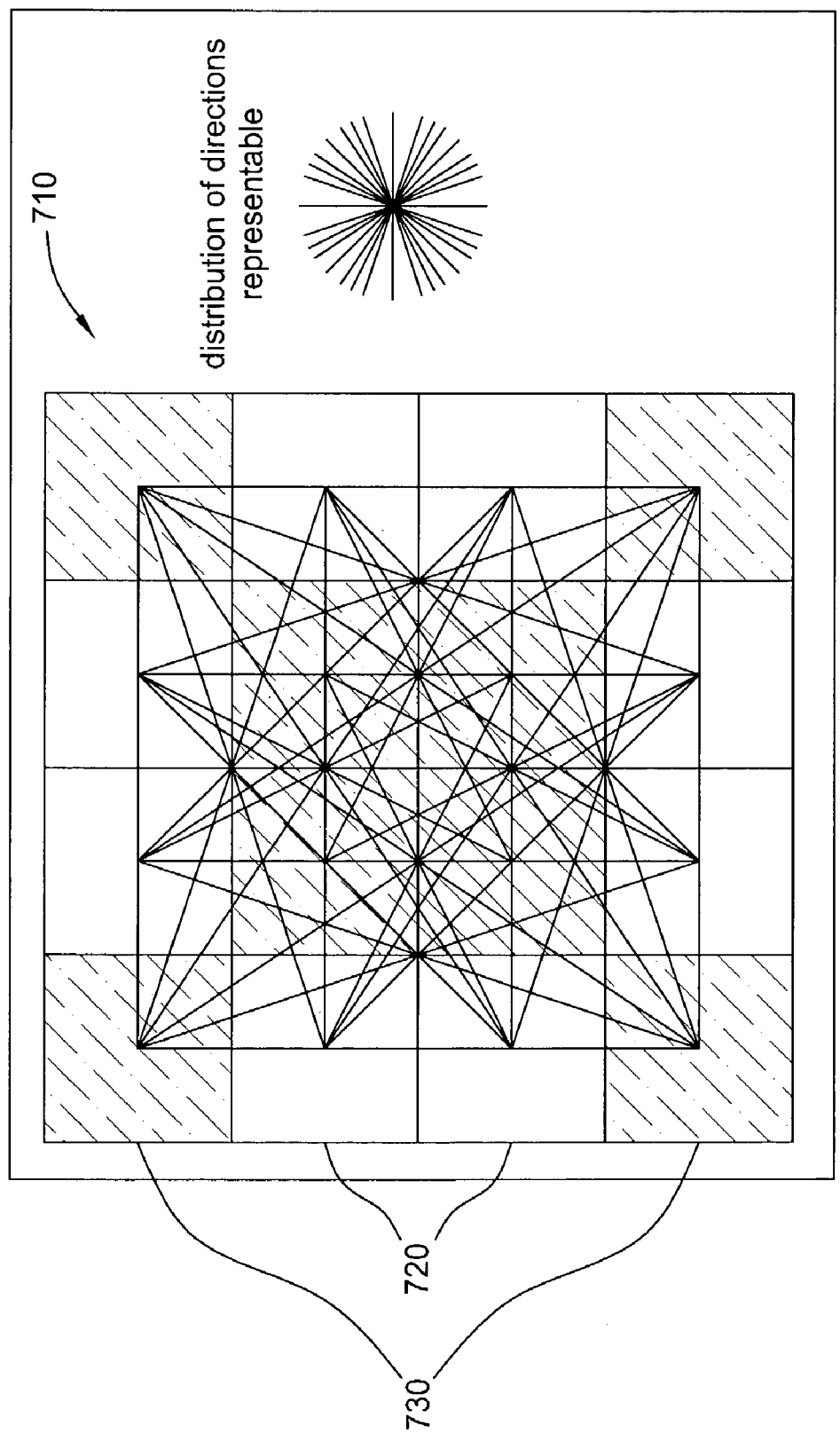
FIG. 7 illustrates a sampling pattern used to determine a predictor.

FIG. 7 illustrates a sampling pattern within the four by four block 710. More specifically, FIG. 7 shows (on the right) all the possible plane gradient directions achievable by choosing any two squares, and (on the left) that all of these directions can be encoded by selecting one square from each of the 2 groups (colored light and dark). By splitting the two samples into two groups, their positions may be specified using three bits per sample, instead of four bits that are necessary to define 16 positions. The pattern for the two groups of samples is chosen to permit representation of all possible gradient directions within a four by four grid. This sampling pattern is shown in FIG. 7, where the two groups of samples 720 and 730 have different shading.

Figure 8:
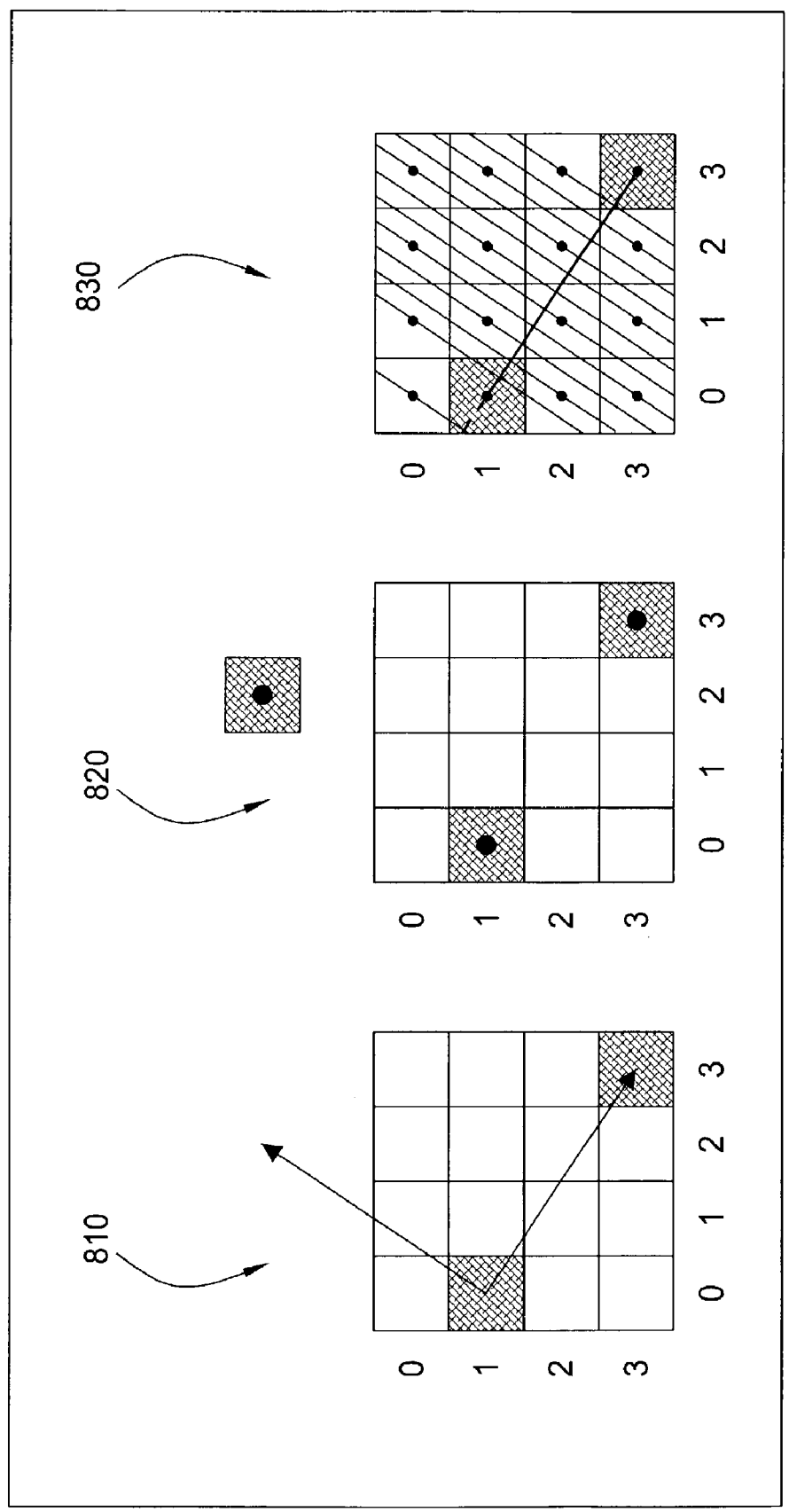
FIG. 8 illustrates several equivalent ways to interpret the planar prediction.

FIG. 8 illustrates several equivalent ways to interpret the planar prediction. Specifically, a plane can be defined by a position and two vectors 810, a plane can be defined by three points 820, or a gradient defined by two points 830.

Although the present invention describes the use of a gradient defined by two points to implement the planar prediction, those skilled in the art will realize that other planar predictions can be employed.

Figure 9:
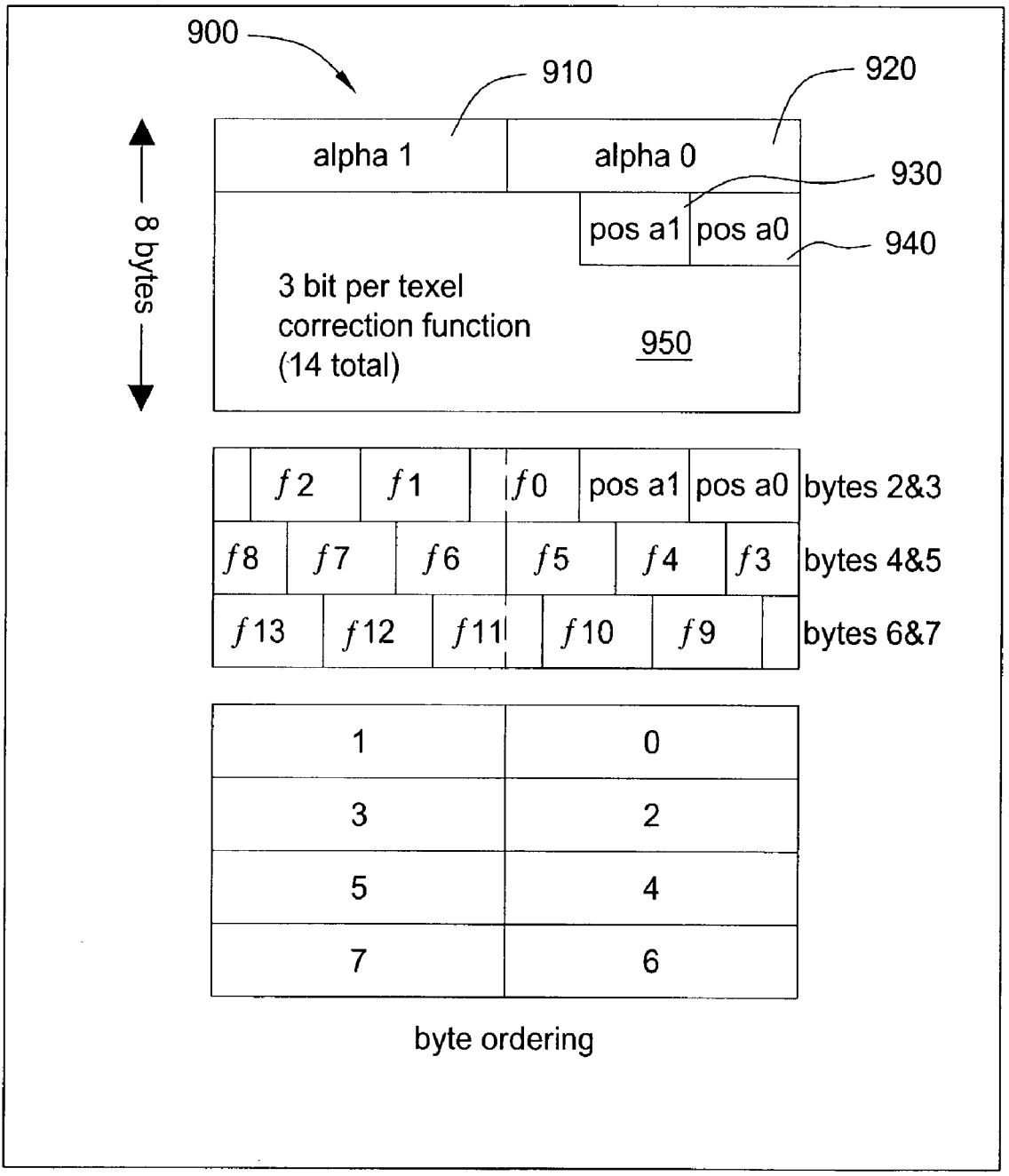
FIG. 9 illustrates a compressed texture data structure of the present invention that describes the alpha component in a four by four block.

FIG. 9 illustrates a compressed texture data structure of the present invention that describes the alpha component in a four by four block. It should be noted that FIG. 9 only illustrates the layout of the eight byte alpha code word for varying alpha. To summarize, the eight byte code word 900 describing the alpha component in a four by four block contains: two 8-bit alpha values 910 and 920, two 3-bit indices 930 and 940 specifying the positions of these alpha values, and fourteen 3-bit correction factors 950.

Figure 10:
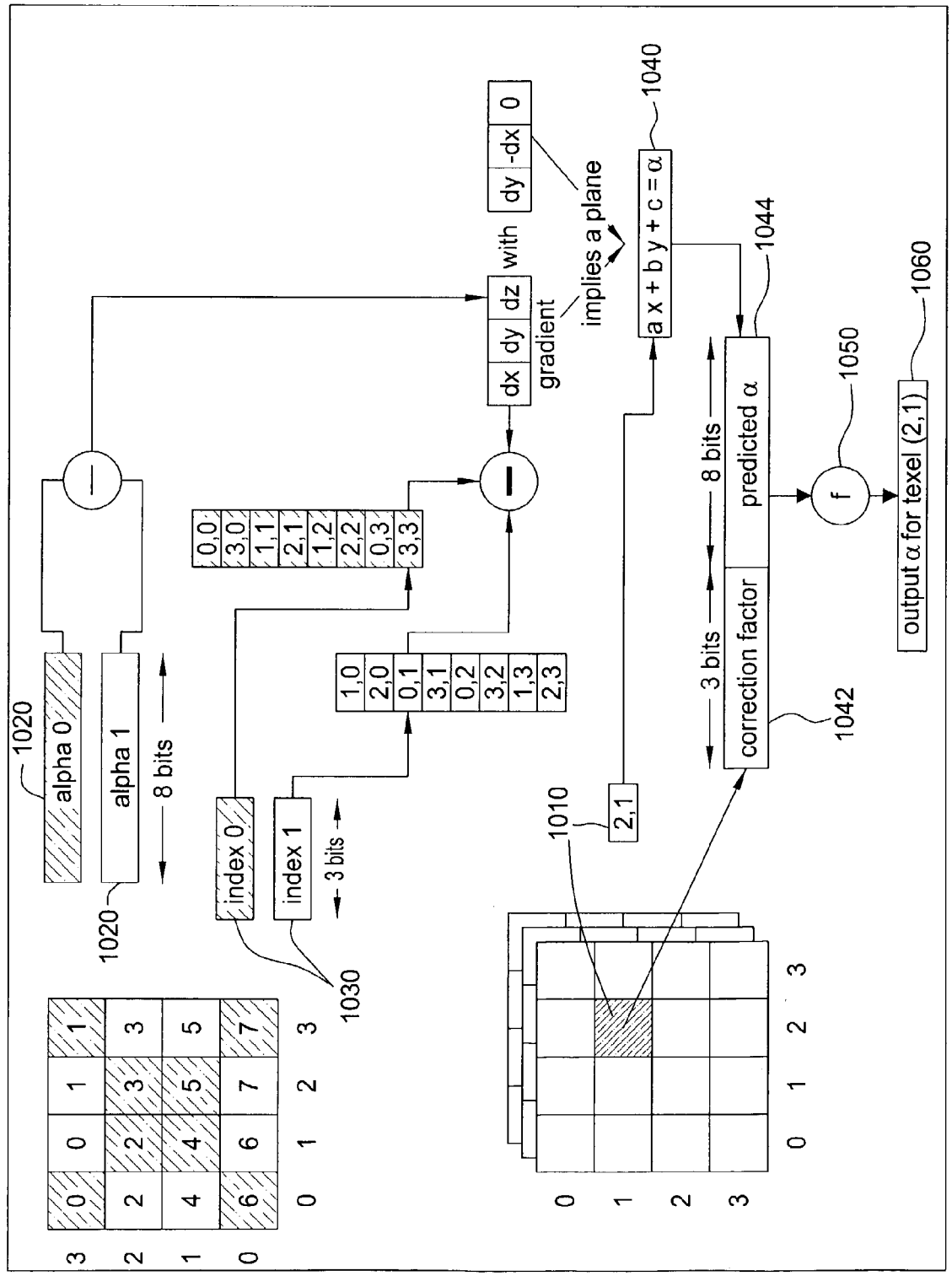
FIG. 10 illustrates the use of the compressed eight-byte code word to extract the relevant alpha values of the present invention.

FIG. 10 illustrates the use of the compressed eight-byte code word to extract or decode the relevant alpha value. In the figure, the predicted alpha value and the 3-bit correction factor are the inputs to a function (f) that produces the final alpha value for the texel.

Specifically, FIG. 10 illustrates the decoding of the alpha value for a texel 1010 at position (2,1). The alpha values (alpha 0 and alpha 1) 1020 and the position indexes (index 0, index 1) 1030, are used to generate a predicted alpha value, e.g., by computing a plane equation 1040. Finally, the correction factor for the texel (2,1) in conjunction with the predicted alpha value is applied to a function 1050 to output the alpha value for texel (2,1) 1060.

Figure 11:
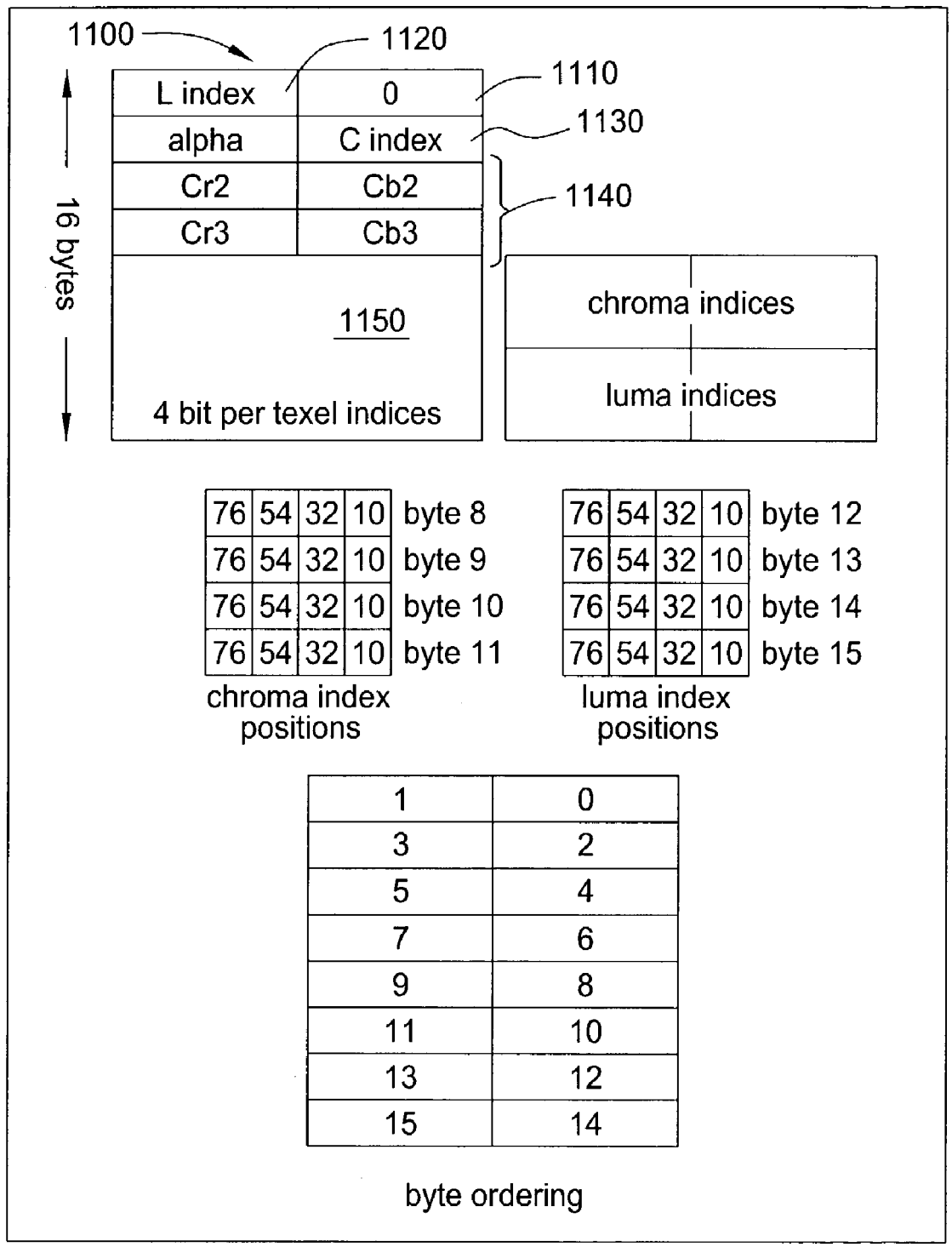
FIG. 11 illustrates a compressed texture data structure of the present invention that describes the alpha component in a four by four block.

FIG. 11 illustrates a compressed texture data structure of the present invention that describes the alpha component in a four by four block of texels. It should be noted that FIG. 11 illustrates the layout of the sixteen-byte alpha code word for constant alpha.

Any RGBα block with constant alpha is specially coded to capture more chrominance information. A coded block with constant alpha is recognized by its having a chroma index 1110 of zero. When coded with constant alpha, the sixteen-byte code word 1100 contains the usual two palette indices for luma 1120 and chroma 1130, but is augmented by the additional of two-chroma pairs 1140 directly stored in the code word. The remainder 1150 of the code word contains four bits per texel to select from the available four luminance and four chrominance values. The layout of the sixteen-byte constant alpha code word is illustrated in FIG. 11. It should be noted that the normal position for the chroma index is set to zero.

Figure 12:
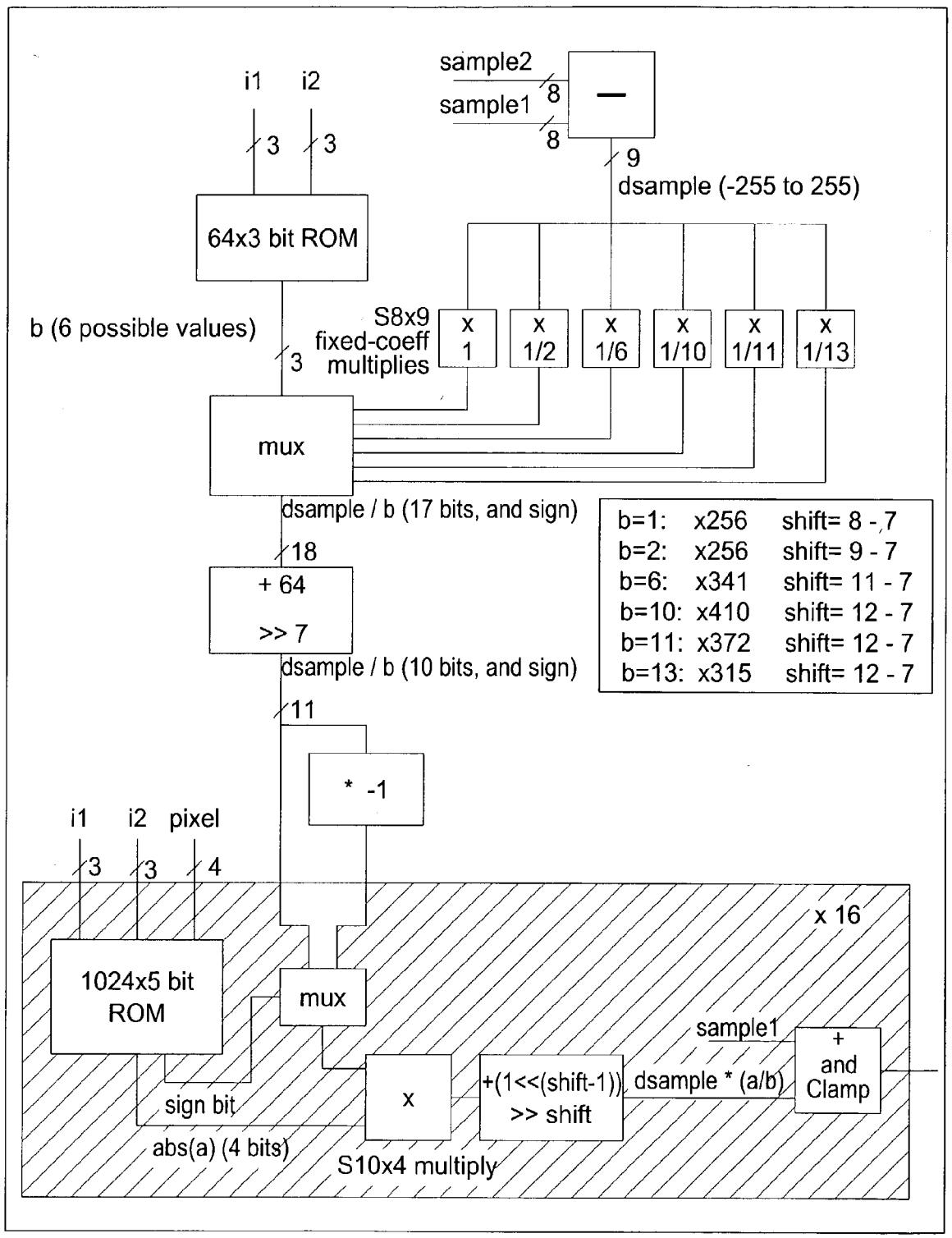
FIG. 12 illustrates a method for generating predicted alpha values.
Figure 13:
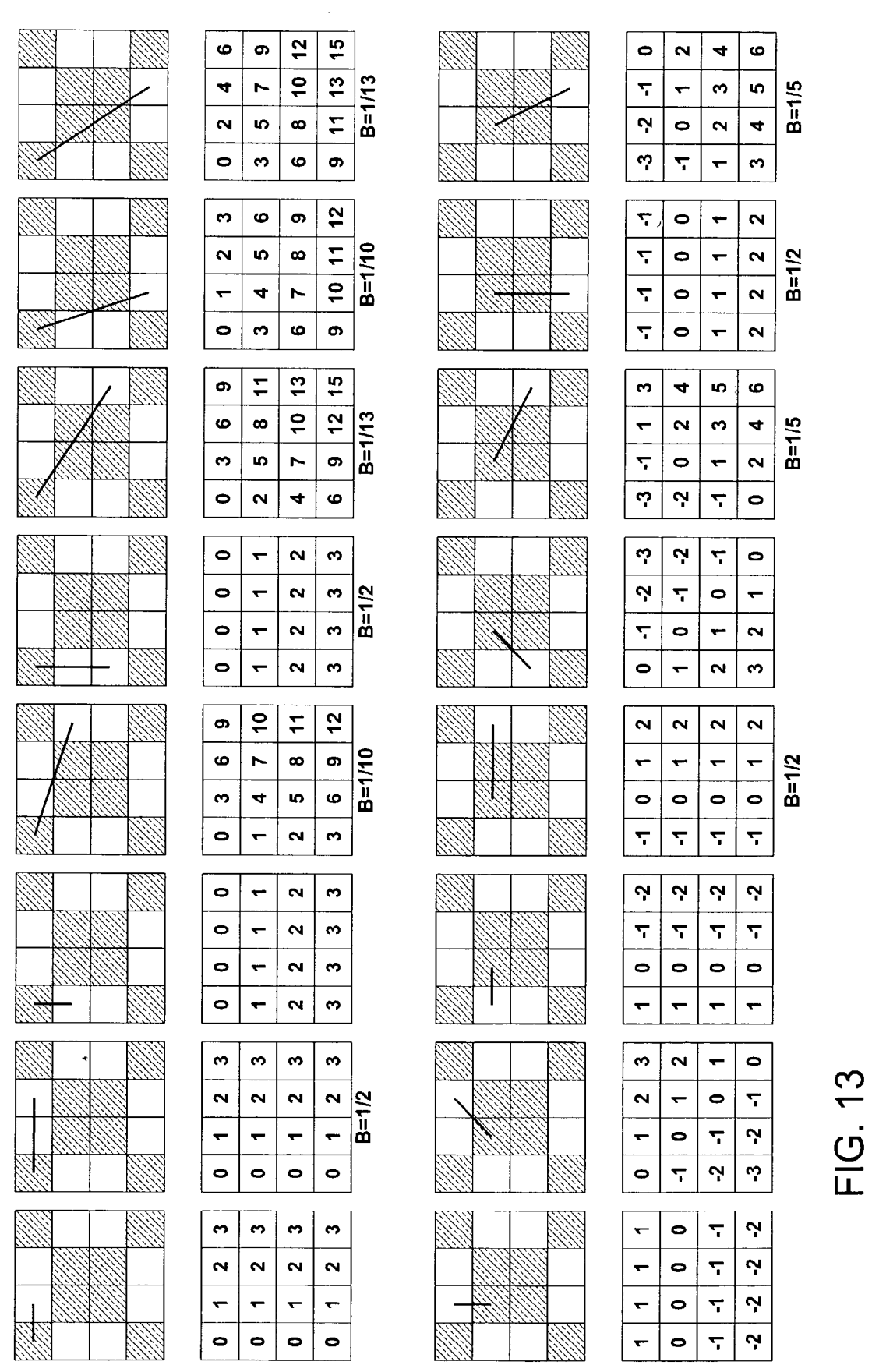

In one alternate embodiment, rather than computing a plane equation as discussed in FIG. 10 above, the present invention employs a table driven linear combination of the sample alpha values. The predicted alpha value is computed using a computation similar to the one illustrated in FIG. 12. The fractional values required for the calculation are illustrated in FIG. 13, where a plurality of different gradient directions are shown. All other combinations are symmetrically covered by this selection. The top half of FIG. 12 shows the computation that is done once per 4×4 block. The bottom half (in the grey box) shows the computation that is done 16 times per block, (once per texel). Description of blocks, from top to bottom:

Block with minus sign:
computes the difference between the two samples, by subtracting sample1 from sample2.

Block labeled "64×3 bit ROM":
The scaling factor ("a/b") for each texel has the same denominator ("b"). This denominator depends on the positions (i1 and i2) of the two plane-defining samples. There are 6 possible denominators. This block takes as input i1 and i2, and looks up the denominator in a table. (The denominators are shown in FIG. 13, underneath the tables. Tables without a denominator shown have a denominator of 1.)

Six blocks labeled "×1", "×½", etc.:
These blocks multiply the difference of the samples by 6 values: 1, ½, ⅙, ⅟₁₀, ⅟₁₁, and ⅟₁₃. Only one of these values will be used per block. Six fixed-coefficient multipliers are cheaper than a single more general multiplier.

Block labeled "mux":
Selects the sample difference divided by the desired denominator.

Bock labeled "+64>>7":
This block rounds the result.

Block labeled "*−1":
This block computes the negative of the result. Depending on the sign of values computed below, either the positive or negative value will be selected for each pixel.

Block labeled "1024×5 bit ROM":
This block returns the numerator "a" of scaling factor ("a/b"). It depends on the positions i1 and i2 of the samples, and which of the 16 texels are being decoded. The values in the ROM for some planes are shown in the tables of FIG. 13.

Block labeled "mux":
Selects the positive or negative values from above, depending on the sign bit from the table.

Block labeled "x":
Multiplies "a" from the table by the positive or negative value from above.

Block labeled "+(1<<(shift−1))>>shift":
rounds the result.

Block labeled "+ and Clamp":
Adds sample1 and the multiplied value from the previous block. If the value is less than 0, it is clamped to 0. If the value is greater than 255, it is clamped to 255. This is the resulting decoded alpha value.

The correction function shown as an f 1050 in FIG. 10 takes a total of eleven bits as input and produces a final eight-bit alpha value. The function was established off-line by applying the planar predictor algorithm to a large number of representative images and computing ideal correction values for all 256 predicted alpha values. This approach provides a correction function that is efficiently implementable.

Figure 14:
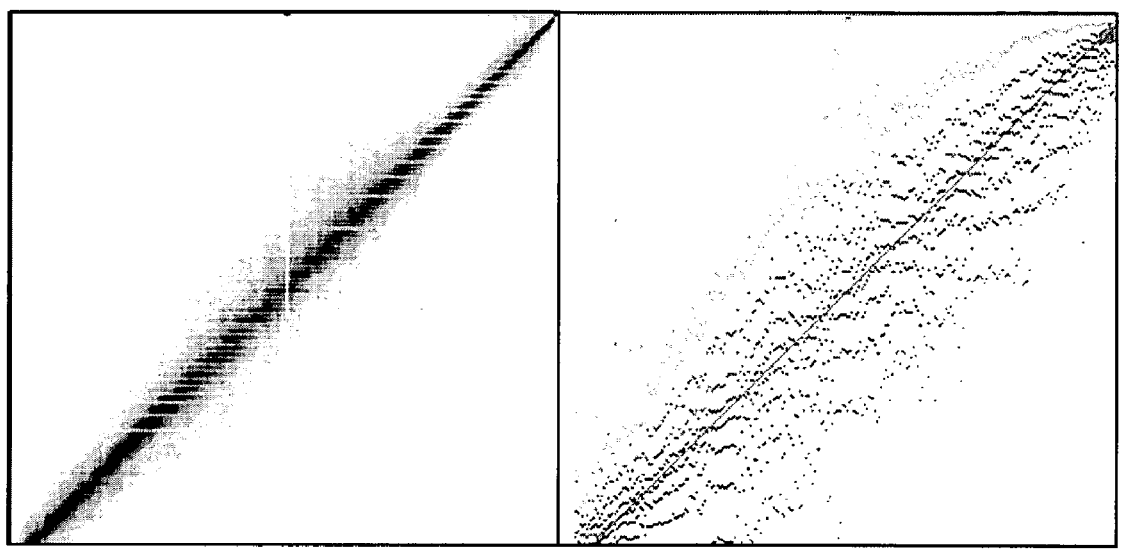
FIG. 14 illustrates a histogram of desired alpha values.

For example, FIG. 14 illustrates a histogram of desired alpha values on the left, and a best fit to eight correction values shown on the right. The input images used for this training are similar in content to alpha that is used to represent transparency.

Figure 15:
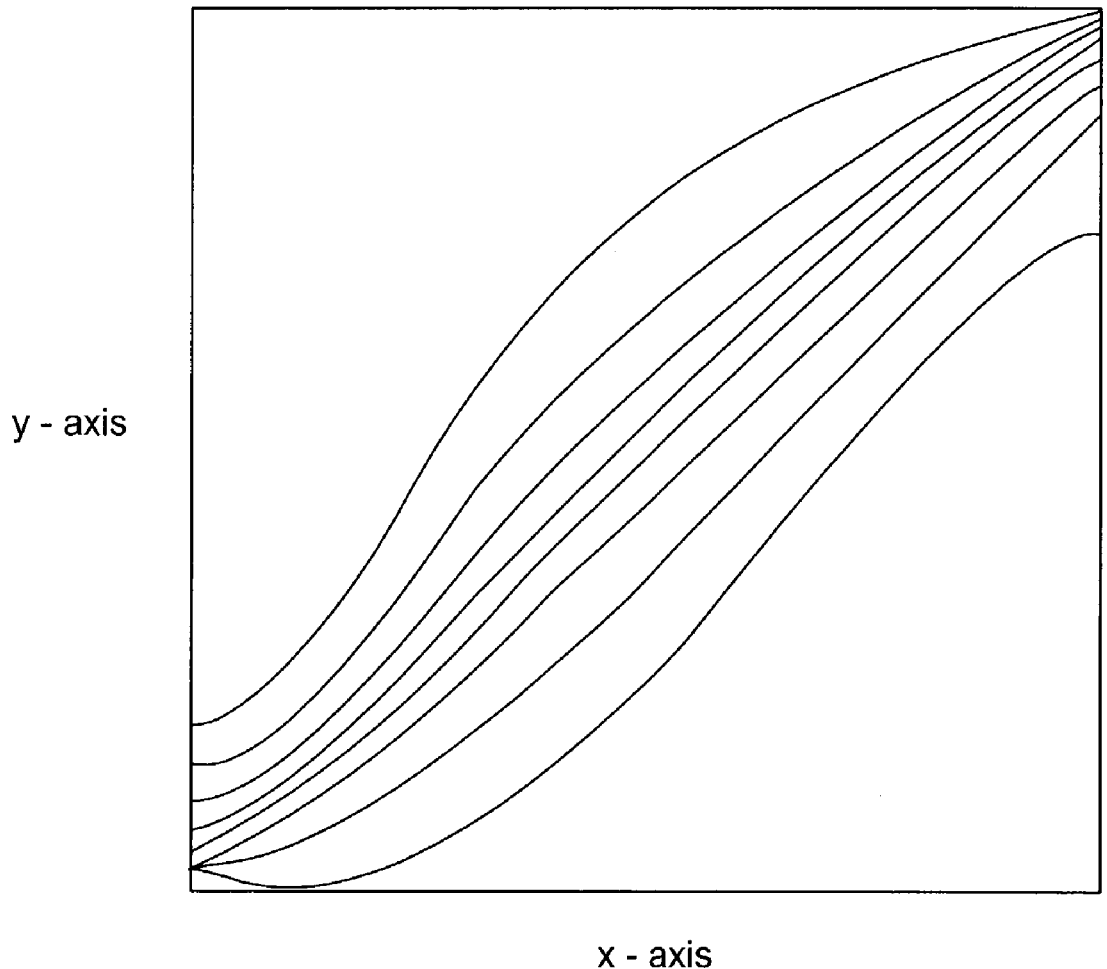
FIG. 15 illustrates the data from the right half of FIG. 14 fitted with quintic polynomials.

FIG. 15 illustrates the data from the right half of FIG. 14 fitted with quintic polynomials. The eight (8) curves form roughly parallel lines. Namely, the x-axis represents the calculated gradient values (i.e., decompressed value), the y-axis represents the desired alpha values (i.e., actual alpha values). Using the three correction bits, one of the eight curves is selected to derive the desired alpha value for a particular texel.

Specifically, for each pixel in a 4×4 block, the 8-bit predicted alpha and the 3-bit correction value are used to compute a final alpha value. The 3-bit correction value is used as an index to select one of eight correction curves, e.g., scalar functions of the predicted alpha value. In one embodiment, the curves are specified with the first 4 bytes of the chrominance palette, corresponding to the unused/reserved index 0.

TABLE 1

Alpha Correction Function Control Bytes

| | | |
|---|---|---|
| B0: | 0 | L0 |
| B1: | 0 | L1 |
| B2: | L | L2 |
| B3: | H | L3 |
| | bit 7 | bits 6–0 |

The high bits of bytes B0 and B1 are reserved and set to 0. The high bit of B2 (L) indicates the existence of a constant zero-valued curve. The high bit of B3 (H) indicates the existence of a constant curve of value 255. In other words, the present invention allows for perfect representation of black or white regardless of the gradient, i.e., allowing any texel to be made equal to 0 or 255. L0–L3 specify pairs of offset values (positive and negative). Offset values that map outside the range 0–255 are wrapped. Seven bits is sufficient to specify any pair, as L and 256-L specify identical pairs. The correction function curves are shown in the following table.

TABLE 2

Alpha Correction Function Curves

| 3-bit correction value | function of predicted alpha (p) |
|---|---|
| 0 | if (H & L): 0, else: p − L0 |
| 1 | if (H & L): 255, else: p + L0 |
| 2 | p − L1 |
| 3 | p + L1 |
| 4 | p − L2 |
| 5 | p + L2 |
| 6 | if (L & !H): 0 |
| | else if (!L & H): 255 |
| | else if (p == 0 and !H): 255 |
| | else if (p == 255 and !L): 0 |
| | else if (p < 128): p + L3 |
| | else if (p > 127): p − L3 |
| 7 | p |

The curves were chosen with two criteria in mind: to provide high-quality compression for many classes of alpha maps, and to allow simple and efficient hardware decompression.

Curve 7 (p, which simply uses the clamped predicted alpha as the final alpha value) is useful in areas where the predictor performs well. This includes areas of constant or smooth alpha, gradients or ramps of any magnitude or direction, and anti-aliased borders between black and white regions.

In areas where the predictor does not provide a good estimate of the actual alpha, offset curves are used to correct the values. Up to four offset values (L0 through L3) can be specified, based on the type of correction necessary for a particular map. For smooth maps, small offsets can be used to correct minor errors. For maps with more high frequencies, larger offsets can be used to minimize error or to provide a better sampling of the range for dithering.

Many alpha maps have large areas of black and/or white. It may be important that the output value is exactly 0 or 255, where an almost-correct value may be unacceptable. Such cases occur on the silhouette edges of regions against a constant background of 0 or 255. For such maps, curves can be specified to output 0 or 255 regardless of the predicted value, allowing black or white at any pixel. Since assigning these dedicated curves reduces the number of curves available for corrections of the predicted value, the black and white curves can be enabled individually per-map as required (with the L and H control bits, described above).

Curve 6 is the most complicated curve, but serves many purposes that have been found to be useful. If only one of L or H is set, then curve 6 is used for that constant curve. Otherwise, there are either 6 or 8 non-constant curves. Since one is simply p, that leaves an odd number of offset curves. In an attempt to sample the space as well as possible, the last offset curve has a positive offset when the predictor is low, and a negative offset when the predictor is high. In addition, the values at 0 and 255 are fixed to map to 255 and 0. This allows regions of binary alpha to be encoded losslessly, without dedicating entire curves to 0 and 255.

Compression

The compression process of generating the palettes is performed offline. Namely, various textures are previously selected and corresponding palettes for these textures are then created offline and forwarded to the texture unit 144.

To illustrate, if each of the palettes is capable of storing 256 entries, then the encoding method will encode a texture into 256 sets of four luminance values and 256 sets of chrominance pairs. The encoding method will generate these 256 sets to four luminance values and 256 sets of chrominance pairs by analyzing the texture map in a four by four block of texels. This approach exploits the assumption that the luminance values and chrominance values are highly correlated within a 4×4 block of texels.

For example, a texture map may have a size of 256 by 256. For each 4×4 block of texels, there would be 16 candidates of color pairs. By taking a mean of the 16 candidates of color pairs, one would arrive with one chrominance pair that best represents the 4×4 block of texels. By using the mean color pair and an arbitrary point selected from within the "cloud" of 16 candidates of color pairs, the encoding method will employ a recursive gradient descend method that will determine a second color pair for the 4×4 block of texels, thereby filling an entry in the chrominance palette. Basically, the process determines which two color pairs best represent the 4×4 texels. This process is repeated until a chrominance palette having 256 entries is generated for the 256 by 256 texture map. In other words, the encoding method will then build a chrominance palette using a recursive gradient descend method to fill the entries of the chrominance palette. Although the present invention discloses a particular encoding method, those skilled in the art will realize that other encoding methods can be employed with the present decompression approach.

Figure 16:
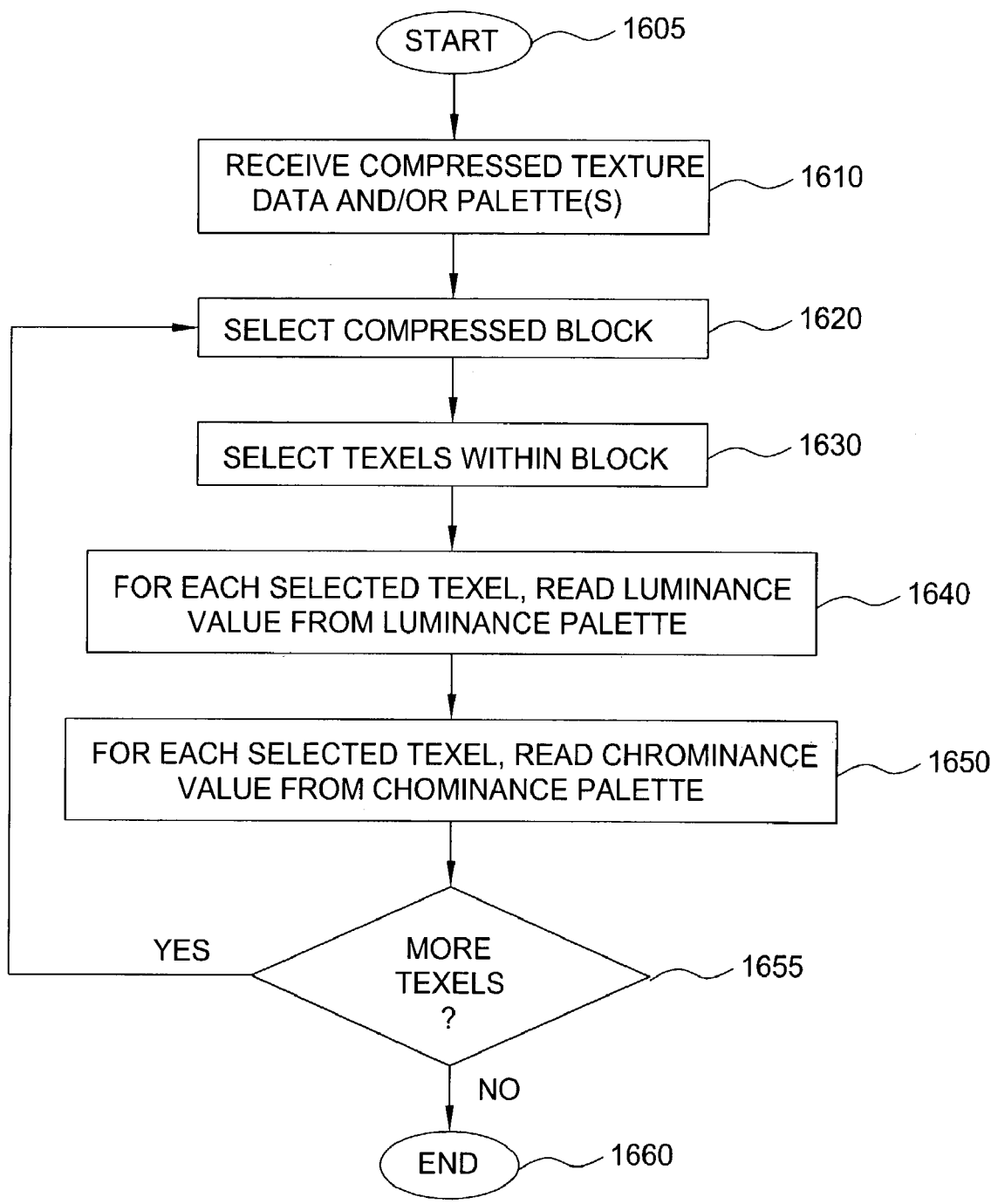
FIG. 16 illustrates a texture decompression method of the present invention.

FIG. 16 illustrates a texture decompression method 1600 of the present invention. Method 1600 starts in step 1605 and proceeds to step 1610.

In step 1610, compressed texture data e.g., code word 200 of FIG. 2, and/or luminance and chrominance palettes are received by the texture unit 144. It should be noted that the luminance and chrominance palettes can be dynamically downloaded to the texture unit 144 as needed, along with the compressed texture data. Alternatively, the relevant luminance and chrominance palettes can be initially installed within the texture unit 144 during an initialization of the texture unit.

The following descriptions repeated refer to decoding "one or more texels" within a block. In most actual implementations, an entire 4×4 block would be decoded, and then the desired texels would be selected from that block. In particular, the decoding would take place between the frame buffer and texture cache (as shown in FIG. 1). The texture data from the frame buffer would be decoded and stored in the texture cache. Then, decoded texels would be accessed from the cache as needed.

In steps 1620 and 1630, method 1600 selects a compressed block for decompression and then selects one or more texels within the selected block where the polygon of a modeled object intersect with the texels. Namely, the polygon of the modeled object requires the texture of a particular block of texels.

In step 1640, for each of the selected texels, the luminance value corresponding to the selected texel is read from the luminance palette. In one embodiment, four luminance values are read from one entry of the luminance palette and the relevant luminance value is then selected using two bits.

In step 1650, for each of the selected texels, the chrominance values corresponding to the selected texel is read from the chrominance palette. In one embodiment, two chrominance pairs are read from one entry of the chrominance palette and the relevant chrominance pair is then selected using one bit.

In step 1655, method 1600 queries whether there are any additional texels that are needed from the palette. If the query is positively answered, then method 1600 proceeds to step 1620 and the process of steps 1620–1650 are repeated. If the query is negatively answered, then method 1600 proceeds to step 1660 where the process ends.

Figure 17:
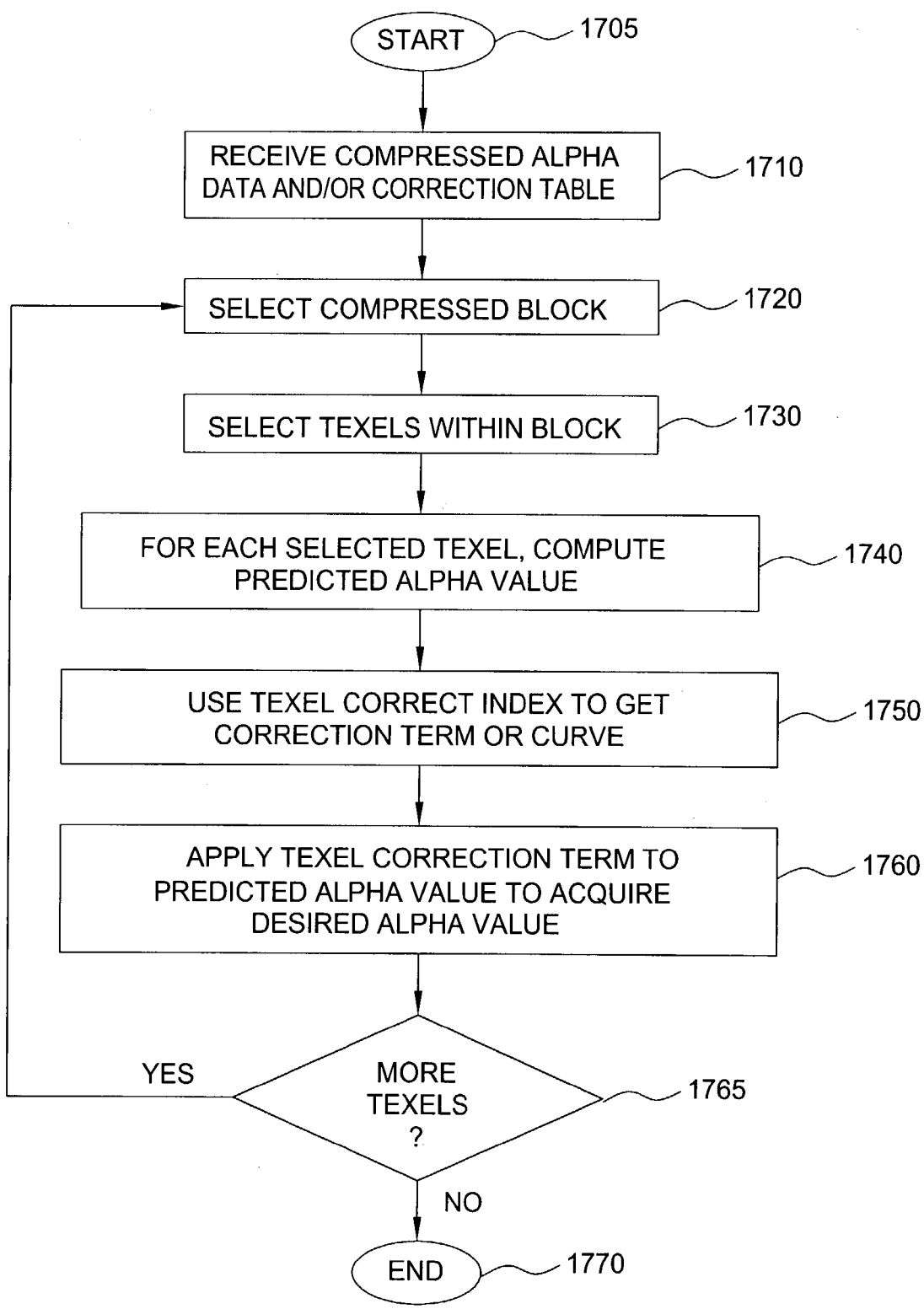
FIG. 17 illustrates an alpha decompression method of the present invention.

FIG. 17 illustrates an alpha decompression method 1700 of the present invention. Method 1700 starts in step 1705 and proceeds to step 1710.

In step 1710, compressed alpha data e.g., code words 900 or 1100 of FIG. 9 and FIG. 11, and/or correction tables or correction curves are received by the texture unit 144. It should be noted that the correction tables or correction curves can be dynamically downloaded to the texture unit 144 as needed, along with the compressed alpha data. Alternatively, the relevant correction tables or correction curves can be initially installed within the texture unit 144 during an initialization of the texture unit.

In steps 1720 and 1730, method 1700 selects a compressed block for decompression and then selects one or more texels within the selected block where the polygon of a modeled object intersect with the texels. Namely, the polygon of the modeled object requires the alpha of a particular block of texels.

In step 1740, for each of the selected texels, a predicted alpha (a) is computed in accordance with a planar equation.

In step 1750, for each of the selected texels, a 3-bit correction factor 1042 is applied to select a correction term or a correction curve.

In step 1760, the selected correction term or correction curve is applied in conjunction with the predicted alpha to arrive at the desired alpha value.

In step 1765, method 1700 queries whether there are any additional texels that are needed. If the query is positively answered, then method 1700 proceeds to step 1720 and the process of steps 1720–1760 are repeated. If the query is negatively answered, then method 1700 proceeds to step 1770 where the process ends.

Although various embodiments which incorporate the teachings of the present invention have been shown and described in detail herein, those skilled in the art can readily devise many other varied embodiments that still incorporate these teachings.

What is claimed is:

1. A method for decompressing a compressed texture data, said method comprising:
   receiving a compressed texture data;
   selecting a compressed texture block within said compressed texture data, wherein said compressed texture block comprises a luminance palette index, a chrominance palette index and a plurality of texel indices for a plurality of texels that formed said compressed texture block, wherein each of said texel indices corresponds to an index within a palette entry selected by said luminance palette index and said chrominance palette index;
   reading a luminance value of a selected texel from a stored luminance palette having a plurality of luminance palette entries using said luminance palette index and a corresponding portion of one of said plurality of texel indices; and
   reading a chrominance value of said selected texel from a stored and a chrominance palette having a plurality of chrominance palette entries using said chrominance palette index and a corresponding portion of one of said plurality of texel indices.

2. The method of claim 1, wherein said compressed texture block is a four by four block of texels.

3. The method of claim 2, wherein said four by four block of texels is represented using an eight-byte code word.

4. The method of claim 1, wherein each of said texel indices is represented using at three or four bits.

5. The method of claim 1, wherein said reading steps are repeated for a plurality of selected texels.

6. A computer-readable medium having stored thereon a plurality of instructions, the plurality of instructions including instructions which, when executed by a processor, cause the processor to perform the steps comprising of:
   receiving a compressed texture data;
   selecting a compressed texture block within said compressed texture data, wherein said compressed texture block comprises a luminance palette index, a chrominance palette index and a plurality of texel indices for a plurality of texels that formed said compressed texture block, wherein each of said texel indices corresponds to an index within a palette entry selected by said luminance palette index and said chrominance palette index;
   reading a luminance value of a selected texel from a stored luminance palette having a plurality of luminance palette entries using said luminance palette index and a corresponding portion of one of said plurality of texel indices; and
   reading a chrominance value of said selected texel from a stored and a chrominance palette having a plurality of chrominance palette entries using said chrominance palette index and a corresponding portion of one of said plurality of texel indices.

7. The computer-readable medium of claim 6, wherein said compressed texture block is a four by four block of texels.

8. The computer-readable medium of claim 7, wherein said four by four block of texels is represented using an eight-byte code word.

9. The computer-readable medium of claim 6, wherein each of said texel indices is represented using at three or four bits.

10. The computer-readable medium of claim 6, wherein said reading steps are repeated for a plurality of selected texels.

11. An apparatus for decompressing a compressed texture data, comprising:
  means for receiving a compressed texture data;
  means for selecting a compressed texture block within said compressed texture data, wherein said compressed texture block comprises a luminance palette index, a chrominance palette index and a plurality of texel indices for a plurality of texels that formed said compressed texture block, wherein each of said texel indices corresponds to an index within a palette entry selected by said luminance palette index and said chrominance palette index;
  means for reading a luminance value of a selected texel from a stored luminance palette having a plurality of luminance palette entries using said luminance palette index and a corresponding portion of one of said plurality of texel indices; and
  means for reading a chrominance value of said selected texel from a stored and a chrominance palette having a plurality of chrominance palette entries using said chrominance palette index and a corresponding portion of one of said plurality of texel indices.

12. The apparatus of claim 11, wherein said compressed texture block is a four by four block of texels.

13. The apparatus of claim 12, wherein said four by four block of texels is represented using an eight-byte code word.

14. The apparatus of claim 11, wherein each of said texel indices is represented using at three or four bits.

15. The apparatus of claim 11, wherein said reading means apply the reading operations to a plurality of selected texels.

16. A method for decompressing a compressed alpha data, said method comprising:
  receiving a compressed alpha data;
  selecting a compressed block within said compressed alpha data, wherein said compressed block comprises a first alpha value, a second alpha value, a position of said first alpha value, a position of said second alpha value and a texel correction index;
  computing a predicted texel alpha value for a selected texel from said first alpha value, said second alpha value, said position of said first alpha value, and said position of said second alpha value;
  acquiring a correction value by applying said texel correction index to a stored correction table; and
  applying said correction value to said predicted texel alpha value to generate a desired alpha value for said selected texel.

17. The method of claim 16, wherein said correction value is representative of an offset value.

18. The method of claim 16, wherein said correction value is representative of an absolute value.

19. The method of claim 16, wherein said compressed block is a four by four block of texels.

20. The method of claim 19, wherein said four by four block of texels is represented using an eight-byte code word.

21. The method of claim 16, wherein each of said first and second alpha values is represented using exactly eight bits.

22. The method of claim 16, wherein each of said first and second positions is represented using exactly three bits.

23. The method of claim 16, wherein said computing, acquiring, and applying steps are repeated for a plurality of selected texels.

24. A computer-readable medium having stored thereon a plurality of instructions, the plurality of instructions including instructions which, when executed by a processor, cause the processor to perform the steps comprising of:
  receiving a compressed alpha data;
  selecting a compressed block within said compressed alpha data, wherein said compressed block comprises a first alpha value, a second alpha value, a position of said first alpha value, a position of said second alpha value and a texel correction index;
  computing a predicted texel alpha value for a selected texel from said first alpha value, said second alpha value, said position of said first alpha value, and said position of said second alpha value;
  acquiring a correction value by applying said texel correction index to a stored correction table; and
  applying said correction value to said predicted texel alpha value to generate a desired alpha value for said selected texel.

25. The computer-readable medium of claim 24, wherein said correction value is representative of an offset value.

26. The computer-readable medium of claim 24, wherein said correction value is representative of an absolute value.

27. The computer-readable medium of claim 24, wherein said compressed block is a four by four block of texels.

28. The computer-readable medium of claim 27, wherein said four by four block of texels is represented using an eight-byte code word.

29. The computer-readable medium of claim 24, wherein each of said first and second alpha values is represented using exactly eight bits.

30. The computer-readable medium of claim 24, wherein each of said first and second positions is represented using exactly three bits.

31. The computer-readable medium of claim 24, wherein said computing, acquiring, and applying steps are repeated for a plurality of selected texels.

32. An apparatus for decompressing a compressed alpha data, comprising:
  means for receiving a compressed alpha data;
  means for selecting a compressed block within said compressed alpha data, wherein said compressed block comprises a first alpha value, a second alpha value, a position of said first alpha value, a position of said second alpha value and a texel correction index;
  means for computing a predicted texel alpha value for a selected texel from said first alpha value, said second alpha value, said position of said first alpha value, and said position of said second alpha value;
  means for acquiring a correction value by applying said texel correction index to a stored correction table; and
  means for applying said correction value to said predicted texel alpha value to generate a desired alpha value for said selected texel.

33. The apparatus of claim 32, wherein said correction value is representative of an offset value.

34. The apparatus of claim 32, wherein said correction value is representative of an absolute value.

35. The apparatus of claim 32, wherein said compressed block is a four by four block of texels.

36. The apparatus of claim 35, wherein said four by four block of texels is represented using an eight-byte code word.

37. The apparatus of claim 32, wherein each of said first and second alpha values is represented using exactly eight bits.

38. The apparatus of claim 32, wherein each of said first and second positions is represented using exactly three bits.

* * * * *